(12) United States Patent
Jeon et al.

(10) Patent No.: US 7,058,194 B2
(45) Date of Patent: Jun. 6, 2006

(54) HINGE UNIT FOR HEADSET HAVING CURRENT-CARRYING MEANS

(75) Inventors: Yong-Woo Jeon, Kumi-shi (KR); Kyung-Mok Yoo, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 882 days.

(21) Appl. No.: 09/951,257

(22) Filed: Sep. 13, 2001

(65) Prior Publication Data

US 2002/0110249 A1 Aug. 15, 2002

(30) Foreign Application Priority Data

Feb. 9, 2001 (KR) ................... 2001-6391

(51) Int. Cl.
*H04R 1/02* (2006.01)

(52) U.S. Cl. ............. 381/367; 381/375; 379/433.13; 439/31; 439/789

(58) Field of Classification Search ......... 381/375, 381/383, 366–368, 395; 439/31, 165, 467, 439/789; 455/575.3; 379/433.13
See application file for complete search history.

(56) References Cited

U.S. PATENT DOCUMENTS

| | | | |
|---|---|---|---|
| 861,468 A * | 7/1907 | Kreinsen | ........ 439/31 |
| 4,484,029 A | 11/1984 | Kenney | |
| 5,210,791 A | 5/1993 | Krasik | |
| 5,359,647 A | 10/1994 | Regen et al. | |
| 5,414,769 A | 5/1995 | Gattey et al. | |
| 5,504,812 A | 4/1996 | Vangarde | |
| 5,772,447 A * | 6/1998 | Cheung | ........ 439/31 |
| 5,787,166 A | 7/1998 | Ullman | |
| 6,055,312 A | 4/2000 | Pralus et al. | |
| 6,091,938 A | 7/2000 | Go | |
| 2002/0021800 A1 | 2/2002 | Bodley et al. | |
| 2002/0110249 A1 | 8/2002 | Jeon et al. | |

FOREIGN PATENT DOCUMENTS

| | | |
|---|---|---|
| CN | 1234326 A | 11/1999 |
| DE | 298 08 425 U1 | 10/1998 |
| DE | 298 09 425.2 | 10/1998 |
| DE | 299 08 529 U1 | 9/1999 |
| EP | 0 959 603 A1 | 5/1999 |

(Continued)

OTHER PUBLICATIONS

Combined Search and Examination Report dated Aug. 1, 2002 issued in GB Appln. No. 0130090.4.

(Continued)

*Primary Examiner*—Daniel Swerdlow
(74) *Attorney, Agent, or Firm*—Dilworth & Barrese, LLP (57) ABSTRACT

Disclosed is a hinge unit for a compact headset, which includes a speaker housing and a microphone housing, and which can be worn on the user's ear. The hinge unit comprising: a pair of opposed side hinge arms provided in the speaker housing at one side thereof; a central hinge arm provided in the microphone housing and assembled between the side hinge arms; and a current-carrying means having a pair of first current-carrying hinge members provided in the side hinge arms, and a pair of second current-carrying hinge members provided in the central hinge arm between the first current-carrying hinge members to slidingly surface contact with the first current-carrying hinge members, allowing the speaker housing and the microphone housing to be fully detached, both mechanically and electrically.

6 Claims, 7 Drawing Sheets

FOREIGN PATENT DOCUMENTS

| | | |
|---|---|---|
| EP | WO 01/37524 A1 | 5/2001 |
| WO | WO 00/07176 | 2/2000 |
| WO | WO 01/86923 | 11/2001 |
| WO | WO 01/86923 A1 | 11/2001 |

OTHER PUBLICATIONS

Chinese Office Action dated Jul. 11, 2003, issued in a counterpart application, namely, Appln. No. 01137603.1.

* cited by examiner

HINGE UNIT FOR HEADSET HAVING CURRENT-CARRYING MEANS

PRIORITY

This application claims priority to an application entitled "HINGE UNIT FOR HEADSET HAVING CURRENT-CARRYING MEANS" filed in the Korean Industrial Property Office on Feb. 9, 2001 and assigned Serial No. 2001-6391, the contents of which are hereby incorporated by reference.

BACKGROUND OF THE INVENTION

1. Field of the Invention

The present invention generally relates to a headset for mobile terminals which has a headset for sound and is put on an ear of a user, and more particularly to a hinge unit of a headset having a current-carrying means.

2. Description of the Related Art

In general, a mobile terminal for voice communication has a data input/output (I/O) unit, a handset and an antenna unit which are integrally provided to a single body. Also, considering the distance between an ear and the mouth of a user in conversation with a counterpart, the body has a speaker in the upper side thereof and a microphone in the lower side thereof. Further, a keypad having several keys is mainly used for inputting data, and the inputted data are displayed on a liquid crystal display (LCD) so that the user can visually recognize the data.

Meanwhile, a local radio communication protocol called Bluetooth™ is currently popular. Such Bluetooth™ can be applied to all terminals, and portable units based upon Bluetooth™ are being successively developed for application to the mobile terminal. In the mobile terminal adopting Bluetooth™, the handset is detached from the body as a separate terminal to be put on the ear. Such a portable unit where the handset can be detached from the body to be put on the ear is called a "headset". In other words, the term "headset" means a portable unit in which the handset is detached from the portable terminal body and can be separately carried on the ear.

However, in the headset of the related art, a speaker and a microphone are fixedly positioned. Even if the microphone is pivotally structured with position variability, the microphone can be damaged when improperly rotated. Moreover, when a structure including the microphone is damaged, the headset cannot be used.

SUMMARY OF THE INVENTION

The present invention has been proposed to solve the problems inherent in the related art, and it is therefore an object of the invention to provide a hinge unit by which a microphone housing can be detached from a speaker housing in a headset.

It is another object of the invention to provide a hinge unit having a current-carrying means for electrically connecting a microphone housing and a hinge housing to a Bluetooth™ module.

A preferred embodiment of the invention provides a hinge unit for a headset which includes a speaker housing and a microphone housing to be put on an ear, the hinge unit comprising: a pair of opposed side hinge arms each of which is provided on one side of the speaker housing; a central hinge arm provided in the microphone housing positioned between the side hinge arms; and a current-carrying means having a pair of first current-carrying conductive hinge members provided in the side hinge arms, and a pair of second current-carrying conductive hinge members provided in a length of the central hinge arm between the first current-carrying conductive hinge members to slidingly surface contact the first current-carrying conductive hinge members, whereby a mutually detachable structural connection and an electrical connection are made between the speaker housing and the microphone housing.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT(S)

The following detailed description of a preferred embodiment of the invention will be made in reference to the accompanying drawings. In describing the invention, explanation about related functions or constructions which are known to the art will be omitted for the sake of clearness in understanding the concept of the invention.

Figure 1:
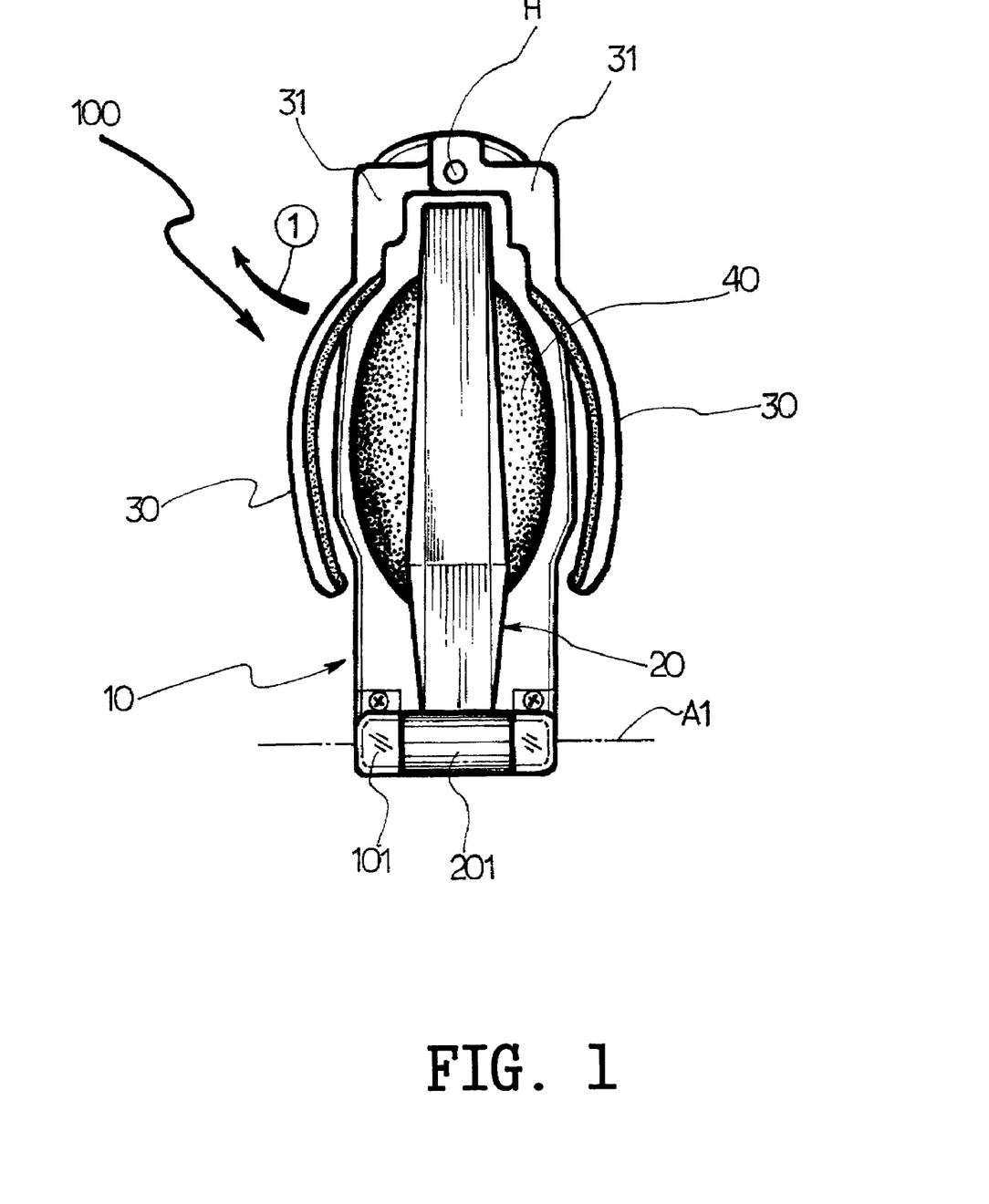
FIG. 1 is a plan view showing a closed state of a microphone housing of a headset having a hinge unit according to an embodiment of the invention.
Figure 2:
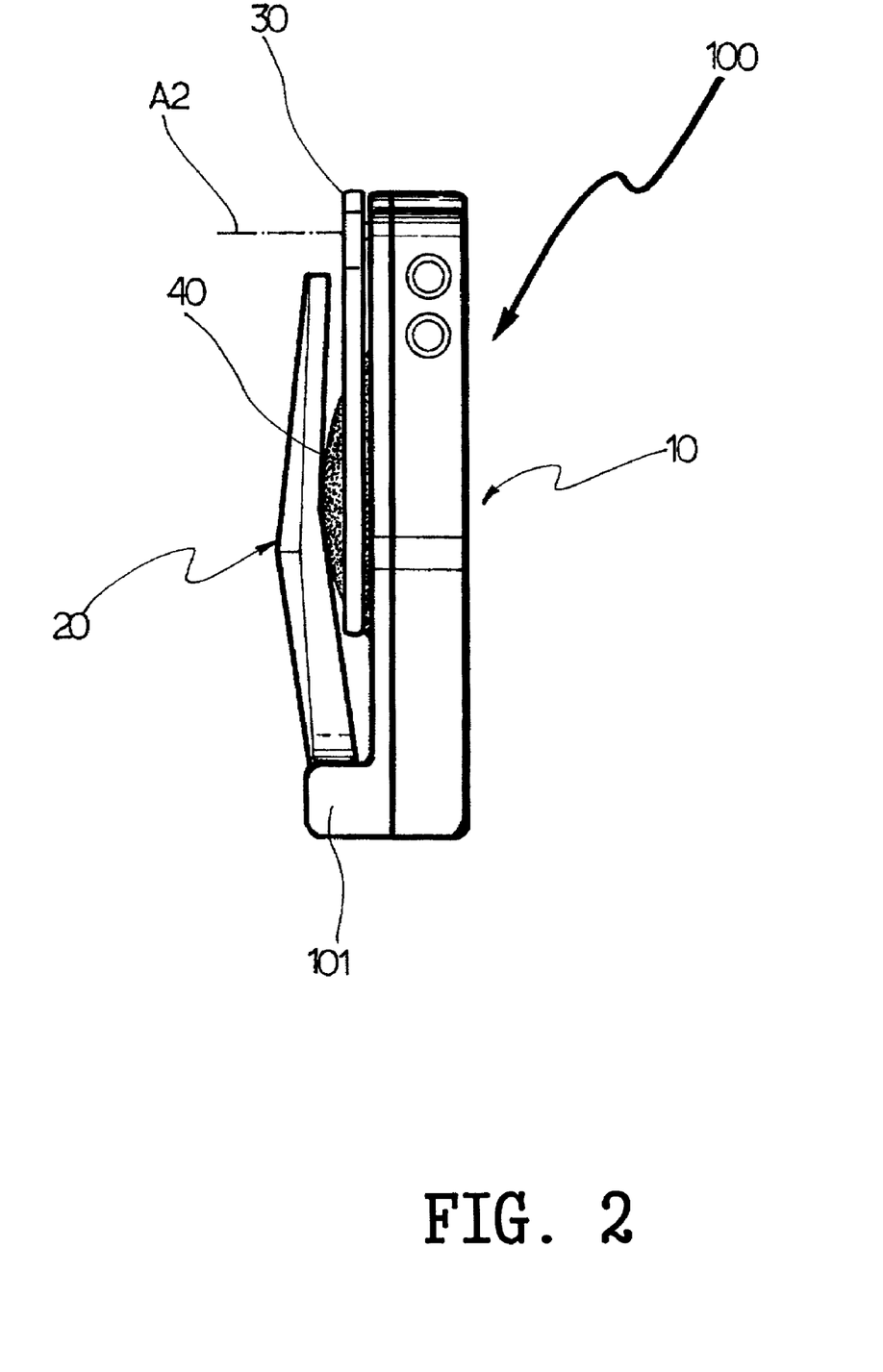
FIG. 2 is a side elevation view of FIG. 1.
Figure 3:
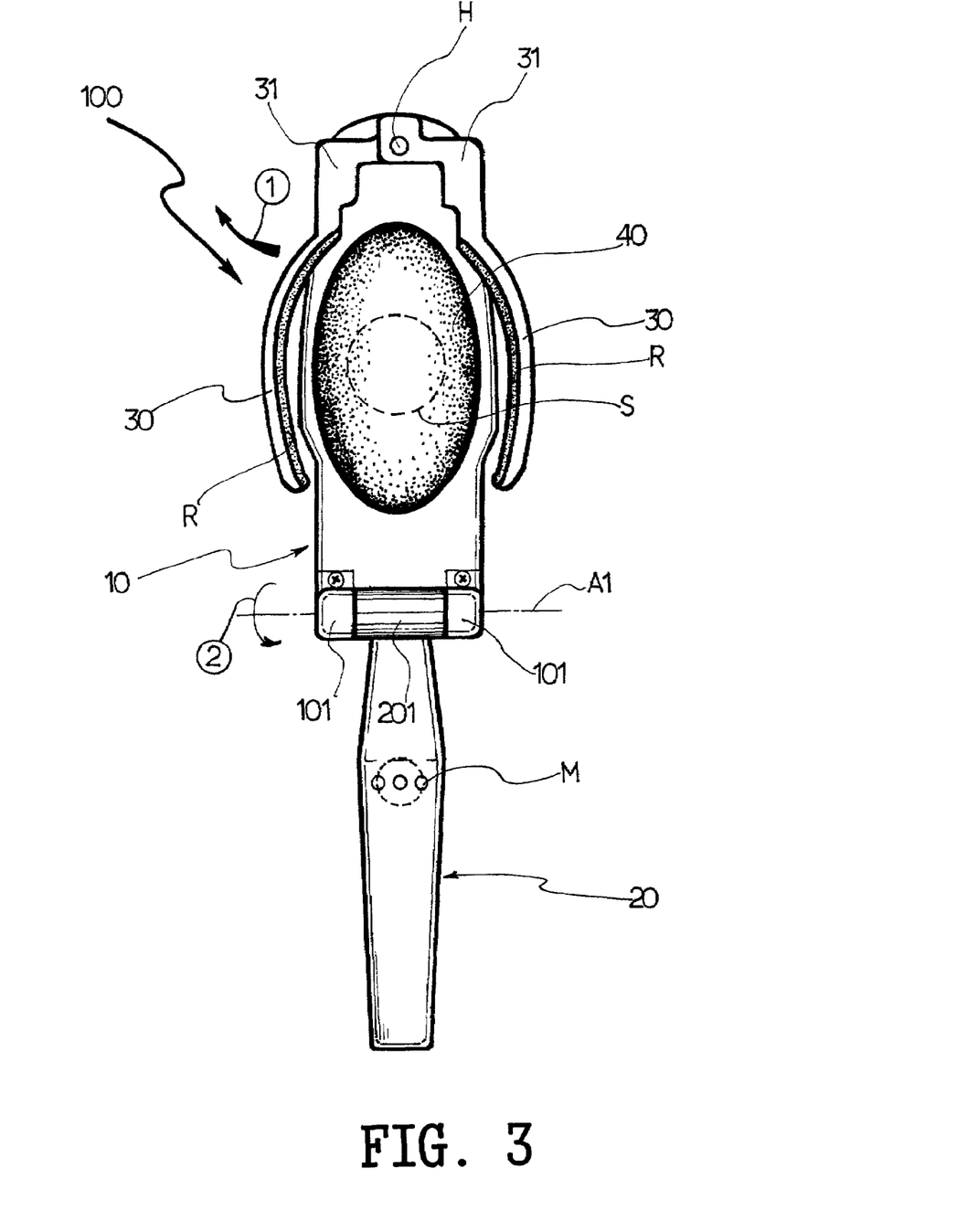
FIG. 3 is a plan view showing an opened state of a microphone housing of a headset having a hinge unit according to an embodiment of the invention.
Figure 4:
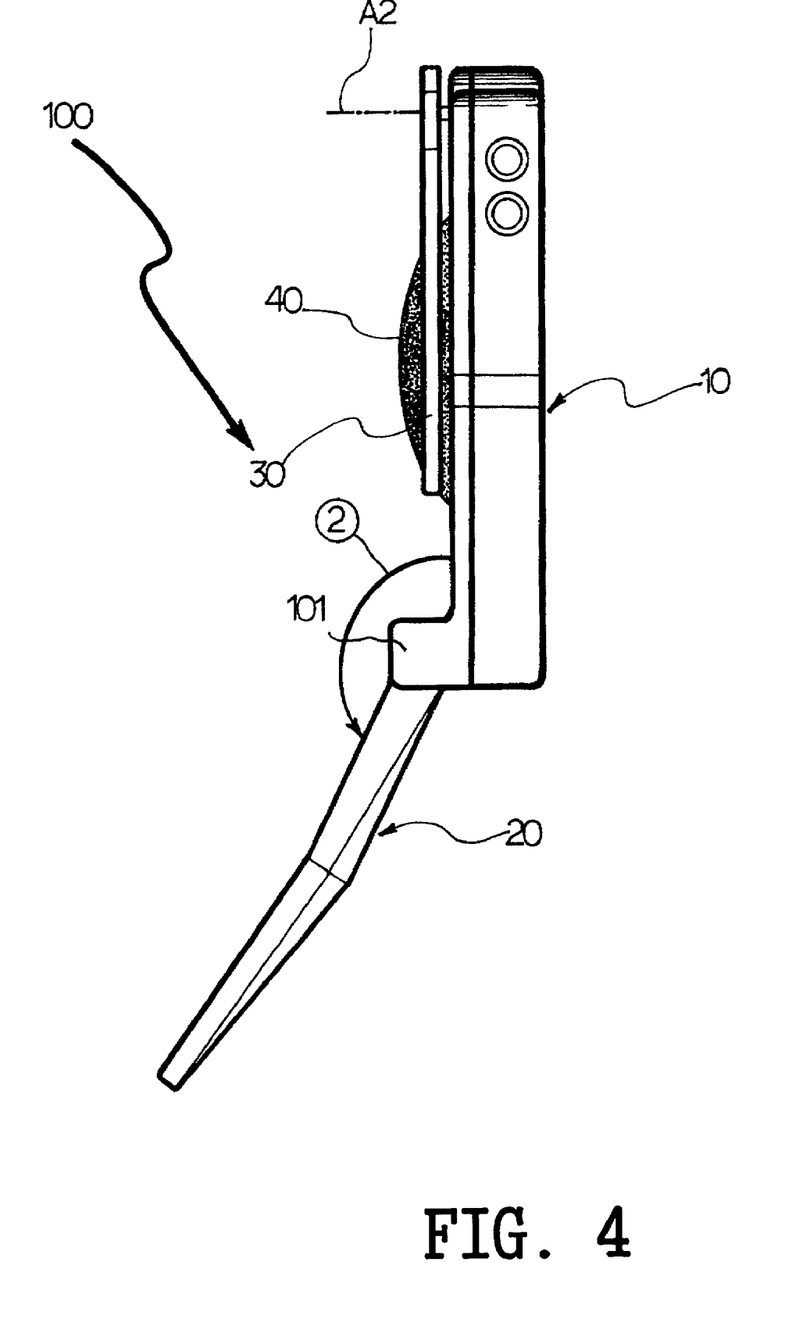
FIG. 4 is a side elevation view of FIG. 3.

Referring to FIG. 1 to FIG. 4, headset 100 of the invention is preferably a terminal which utilizes a wireless communications module to carry out local communication (the wireless communications module is preferably a module sold under the trademark Bluetooth™) that can be put on an ear of a user for communication. The headset can be put on the ear in the optimum state since a microphone housing 20 is rotatably connected to a speaker housing 10 and a sponge-type cushion 40 is provided. Attaching means 30 are also provided to securely contact and support the headset to the ear when the headset is put on the ear. The attaching means 30 have arms 31 and a hinge H, which allows the arms 31 to pivot about a hinge axis A2 as seen in FIG. 2. Hinge H can be spring-biased, or be constructed so as to open incrementally. The headset 100 is put on the ear by using the attaching means 30, causing speaker S to closely contact the ear. Housing 20 pivots about axis A1 (as seen in FIG. 3) so that a microphone M is placed near the user's mouth.

The headset 100 having the hinge unit of the invention is comprised of the speaker housing 10, the microphone housing 20 and the hinge unit for mechanically connecting the speaker housing 10 and the microphone housing 20. The speaker housing 10 and the microphone housing 20 are electrically connected by the hinge unit, with the speaker housing 10 typically including circuitry for a Bluetooth™ module (not shown) as a local radio communication means to carry out signal transmission with the mobile terminal's body (not shown).

The microphone housing 20 is pivotable with respect to the speaker housing 10 about a hinge axis A1. The speaker housing 10 has a pair of side hinge arms 101 on opposing sides of a central hinge arm 201 of the microphone housing. The side hinge arms 101 and the central hinge arm 201 are arranged on the hinge axis A1 to mutually restrain the hinge unit. Here, the microphone housing 20 can detach from the speaker housing 10. In other words, in the event that the microphone housing 20 is applied with an excessive pivoting force while being pivoted with respect to the speaker housing 10, the microphone housing 20 will detach from the speaker housing 10 by the hinge unit of the invention avoiding a fracture that would render the unit unusable. Also, the detached microphone housing 20 can be easily mounted to the speaker housing again.

Figure 5:
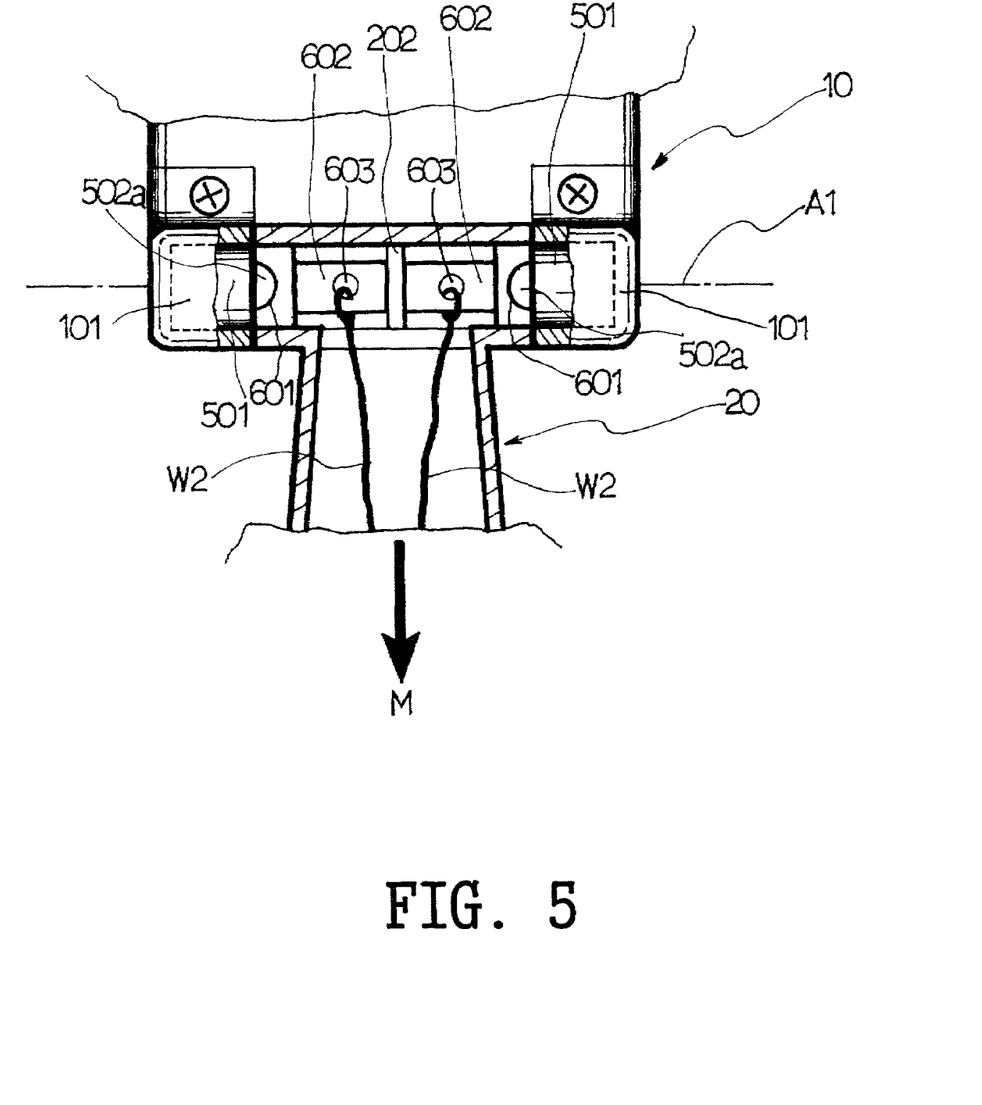
FIG. 5 is a cross-sectional view showing a partially dissected mounting structure of a hinge unit according to an embodiment of the invention.
Figure 6:
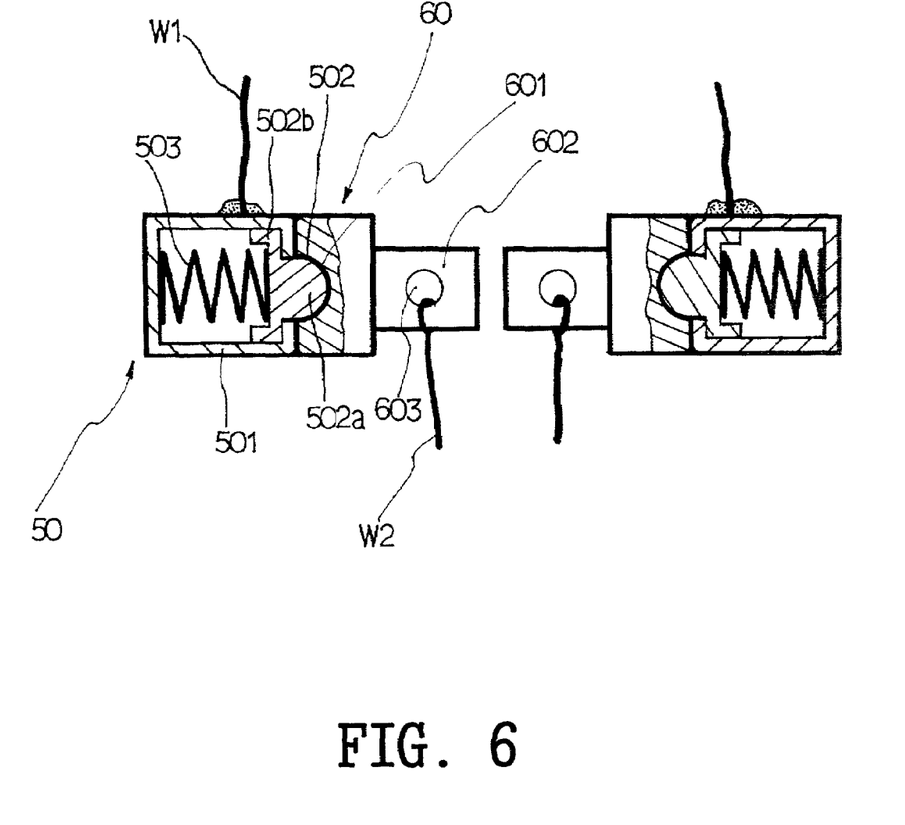
FIG. 6 is a cross-sectional view showing a partially dissected construction of a hinge unit according to an embodiment of the invention.
Figure 7:
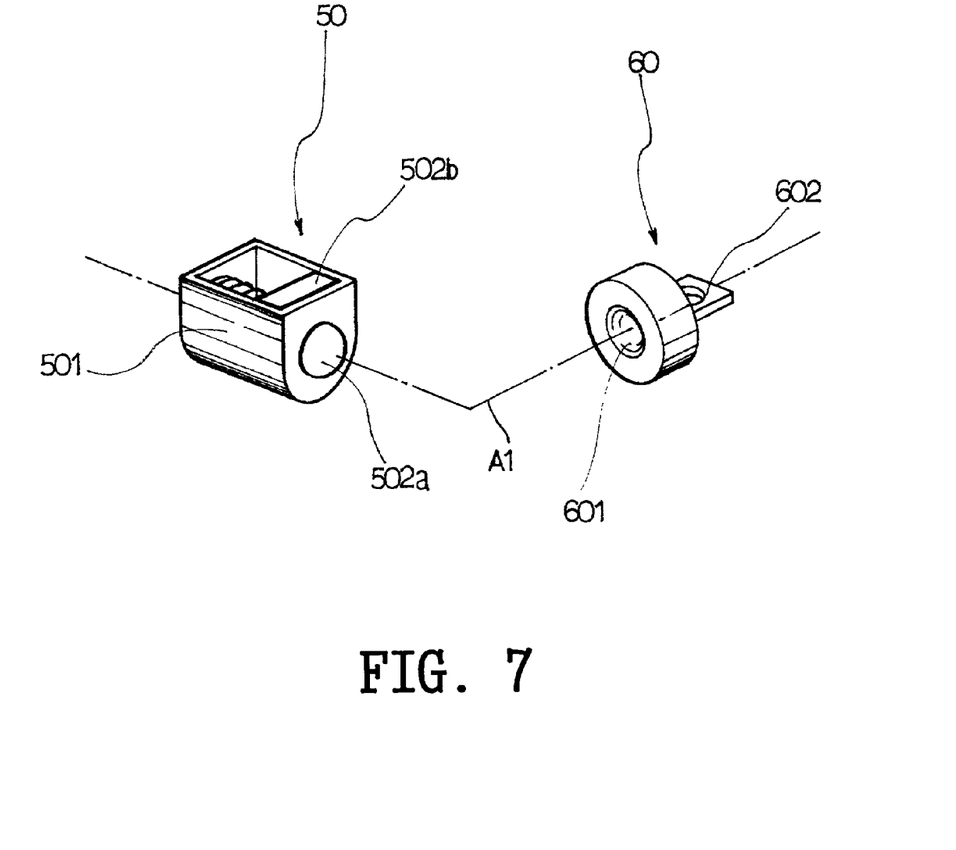
FIG. 7 is a perspective view showing the hinge unit according to an embodiment of the invention.

The following describes a hinge unit having a current-carrying means in accordance with the invention, shown in reference to FIG. 5 to FIG. 7.

Referring to FIG. 5 to FIG. 7, the hinge unit of the invention functions to mechanically and electrically connect a speaker housing 10 and a microphone housing 20. The hinge unit, as best seen in FIG. 7, is comprised of a pair of first current-carrying conductive hinge members 50 and a pair of second current-carrying conductive hinge members 60 which are arranged in the microphone housing and connected with the first conductive hinge members 50. The first current-carrying conductive hinge members 50 are electrically connected to a board where a speaker is connected via wires W1, and the second current-carrying conductive hinge members 60 are electrically connected with a microphone via wires W2. Hinge members 50 and 60 are preferably constructed of metal.

The pair of first current-carrying conductive hinge members 50 are fixedly placed on the side hinge arms 101 of the speaker housing 10, the pair of second current-carrying conductive hinge members 60 are fixedly placed on a central hinge arm 201 of the microphone housing 20. The second current-carrying conductive hinge members 60 are positioned between and oppose the pair of first current-carrying conductive hinge members 50. The second current-carrying conductive hinge members 60 are preferably symmetrically mounted with respect to a partition 202, although symmetry is not required.

Each of the first current-carrying conductive hinge members 50 is comprised of a hinge housing 501, a connector section 502 which is housed within and partially protrudes from the hinge housing 501. Each hinge housing 501 connects with one of the second current-carrying conductive hinge members 60. A coil spring 503 is placed within the hinge housing 501 along the hinge axis for forcing the connector section 502 to protrude from the housing 501 and closely contact its associated second current-carrying conductive hinge members 60. Here, it is preferred that the hinge housing 501, the connector section 502 and the coil spring 503 are made of a conductive material.

The connector section 502 has a hemispherical projection 502a and a fitting section 502b, which is restrained within the hinge housing 501. The connector section 502 is supported by the coil spring 503 for forward or backward displacement along the hinge axis.

Each of the second current-carrying conductive hinge members 60 has a hemispherical recess 601 matching the hemispherical projection 502a at one end thereof, and a connector section 602 at the other end thereof for being connected with one of the wires W2 of the microphone. The connector section 602 is preferably flat-shaped, and has an opening 603 where the end of the each wire W is bound.

As described above, when the microphone housing 20 is assembled to the speaker housing 10, the hemispherical projection 502a and the hemispherical recess 601 maintain a mutually close-contacting state, with the coil spring 503 providing a force for close contact.

Preferably, components composing the first and second current-carrying conductive hinge members 50 and 60 are made through die casting of zinc, and the surfaces thereof are gold plated.

Referring to paths for electric connection of the invention, each path includes a microphone unit M, the wires W2 drawn from the microphone unit M, the connector section 602 where the wire W2 is connected, the hemispherical recess 601 integrally provided with the connector section 602, the hemispherical projection 502a that mates with the hemispherical recess 601, the coil spring 503 connected with the hemispherical projection 502a, the hinge housing 501 connected with the coil spring 503 and the speaker wire W1 soldered to the hinge housing and connected with the board where the speaker is connected.

In use, if an excessive amount of force is applied between the pivotably connected microphone housing 20 and speaker housing 10, the hemispherical recess 601 of the microphone housing 20 will slide away from the hemispherical projection 502a. In other words, the hemispherical projection 502a slidingly moves with the central hinge arm 201 of the microphone housing while being retracted into housing 501 against spring 503 so that the microphone housing 20 may be detached from the speaker housing 10.

On the other hand, in mounting the microphone housing 20 to the speaker housing 10, the hemispherical projection 502a is pressed into housing 50 against spring 503, so that the microphone housing 20 is assembled to the speaker housing 10 along the hinge axis A1.

As a result, the hinge unit of the invention functions to restrain the microphone housing 20 to the speaker housing 10, to detach/attach the restrained microphone housing 20 from/to the speaker housing 10, and to electrically connect the microphone housing 20 with the speaker housing 10.

While description has been made about the detailed embodiments in the foregoing specification of the invention, it will be apparent to those skilled in the art that a number of modification and variations can be made without departing from the scope of the invention. For example, the headset may be mounted to a user's ear as described herein, or may instead include a band for mounting the headset on a user's head and positioning the speaker adjacent the user's ear. In such a case, it is also envisioned that the speaker housings may be provided, one for each ear, with the inventive hinge unit provided on one of the speaker housing so that the microphone housing can be optimally positioned as described herein.

As described hereinbefore, the hinge unit of the invention has advantages that the microphone housing and the speaker housing can be connected mechanically and electrically while the microphone can be detached from the speaker housing thereby preventing damage.

What is claimed is:

1. A hinge unit for a headset which includes a speaker housing and a removable microphone housing, said hinge unit comprising:

a) a pair of side hinge arms fixedly mounted on said speaker housing;

b) a central hinge arm fixedly mounted on said microphone housing and detachably connected to said side hinge arms; and c) a current-carrying means having a pair of first current-carrying hinge members provided in said side hinge arms and a pair of second current-carrying hinge members provided in said central hinge arm wherein said second current-carrying hinge members have a hemispherically shaped surface located adjacent to and between said first current-carrying hinge members, and slidingly contact a corresponding hemispherically shaped surface of said first current-carrying hinge members, wherein the central hinge arm can be detached from, and reattached to, the side hinge arms.

2. A hinge unit for a headset according to claim 1, wherein each of said first current-carrying hinge members includes:

a current-carrying hemispherical projection protruding from a hinge housing for coupling with one of said second current-carrying hinge members; and a coil spring within said hinge housing for providing a force for pushing said hemispherical projection against one of said second current-carrying hinge members.

3. A hinge unit for a headset according to claim 2, wherein each of said second current-carrying hinge members includes:

a hemispherical recess for detachable mechanical coupling with one of said first current-carrying hinge members; and a connector for electrically attaching said second current-carrying hinge member to said microphone housing.

4. A hinge unit for a headset according to claim 1, wherein each of said second current-carrying hinge members includes:

a hemispherical recess for detachable mechanical coupling with one of said first current-carrying hinge members; and a connector for electrically attaching said second current-carrying hinge member to said microphone housing.

5. A hinge unit for a headset according to claim 1, further comprising a module provided in speaker housing to carry out wireless communication with a mobile terminal body.

6. A hinge unit for a headset according to claim 5, wherein said module is a local radio communication protocol module.

* * * * *